(12) United States Patent
Koreki et al.

(10) Patent No.: US 9,191,915 B2
(45) Date of Patent: Nov. 17, 2015

(54) INFORMATION COMMUNICATION APPARATUS, INFORMATION COMMUNICATION SYSTEM, INFORMATION COMMUNICATION METHOD, AND RECORDING MEDIUM

(71) Applicant: CASIO COMPUTER CO., LTD., Shibuya-ku, Tokyo (JP)

(72) Inventors: Taku Koreki, Hino (JP); Kenji Yoshizawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/451,657

(22) Filed: Aug. 5, 2014

(65) Prior Publication Data

US 2015/0050958 A1 Feb. 19, 2015

(30) Foreign Application Priority Data

Aug. 13, 2013 (JP) ................................. 2013-167950

(51) Int. Cl.
| | |
|---|---|
| *H04M 1/00* | (2006.01) |
| *H04W 64/00* | (2009.01) |
| *G01S 19/34* | (2010.01) |
| *G01S 5/02* | (2010.01) |

(52) U.S. Cl.
CPC ............. *H04W 64/00* (2013.01); *G01S 5/0284* (2013.01); *G01S 19/34* (2013.01)

(58) Field of Classification Search
CPC .............................................. H04N 2201/3253
USPC .............. 455/550.1, 552.1, 553.1, 556.1, 557
See application file for complete search history.

(56) References Cited

U.S. PATENT DOCUMENTS

| | | | |
|---|---|---|---|
| 2001/0017668 A1* | 8/2001 | Wilcock et al. | ............... 348/552 |
| 2008/0320174 A1* | 12/2008 | Lee et al. | .......................... 710/4 |

FOREIGN PATENT DOCUMENTS

JP 2011029852 A 2/2011

* cited by examiner

*Primary Examiner* — Kevin Kim
(74) *Attorney, Agent, or Firm* — Holtz, Holtz, Goodman & Chick PC

(57) ABSTRACT

An information communication apparatus is disclosed. The apparatus is provided with a communication unit for communicating with an external apparatus, a first acquiring unit for acquiring signal sent from positioning satelite, a second acquiring unit which uses the communication unit to acquire from the external apparatus signal that is sent from the positioning satelite and received by the external apparatus, a judging unit for judging whether the communication unit is connected to the external apparatus to communicate with said external apparatus, and a controlling unit for controlling the second acquiring unit to perform a process based on the acquired signal, when the judging unit determines that the communication unit is connected to the external apparatus, and for controlling the first acquiring unit perform a process based on the acquired signal, when the judging unit determines that the communication unit is not connected to the external apparatus.

10 Claims, 4 Drawing Sheets

INFORMATION COMMUNICATION APPARATUS, INFORMATION COMMUNICATION SYSTEM, INFORMATION COMMUNICATION METHOD, AND RECORDING MEDIUM

CROSS-REFERENCE TO RELATED APPLICATION

The present application is based upon and claims the benefit of priority from the prior Japanese Patent Application No. 2013-167950, filed Aug. 13, 2013, the entire contents of which are incorporated herein by reference.

BACKGROUND OF THE INVENTION

1. Field of the Invention

The present invention relates to an information communication apparatus, an information communication system, an information communication method, and a recording medium.

2. Description of the Related Art

A conventional technology is known, which uses GPS (Global Positioning System) to measure a location on the earth. For example, an imaging apparatus is provided, which receives signal from GPS satelite and calculates based on the received signal, a location where a picture is taken, and then records image data of the picture together with attribute data representing such location (for instance, refer to Japanese Unexamined Patent Publication No. 2011-29852).

However, in general, an acquisition process which is performed upon receipt of signal from GPS satelite consumes much electricity.

Therefore, if an apparatus has a restriction to its power source capacity, an operation to be performed in a process other than the acquisition process will be disturbed because of power shortage. For example, in the case of battery-loaded imaging apparatuses, they will have a limit in the number of shooting pictures.

SUMMARY OF THE INVENTION

The present invention will reduce electricity consumed in the acquisition process and suppress an influence of the electricity consumption onto other process.

According to one aspect of the invention, there is provided an information communication apparatus which comprises a communication unit which communicates with an external apparatus, a first acquiring unit which acquires a signal sent from a positioning satelite, a second acquiring unit which uses the communication unit to acquire from the external apparatus a signal that is sent from the positioning satelite and is received by the external apparatus, a judging unit which judges whether the communication unit is connected to the external apparatus to communicate with said external apparatus; and a controlling unit which makes the second acquiring unit perform a process based on the acquired signal, when the judging unit determines that the communication unit is connected to the external apparatus, and makes the first acquiring unit perform a process based on the acquired signal, when the judging unit determines that the communication unit is not connected to the external apparatus According to another aspect of the invention, there is provided an information communication system, wherein plural information communication apparatuses are connected to each other through a communication circuit, and at least one of the plural information communication apparatuses which comprises a first acquiring unit which calculates a current location based on a signal sent from a positioning satelite, a second acquiring unit which acquires a signal from the other information communication apparatus through the communication circuit to calculate the current location, wherein the signal is sent from the positioning satelite and is received by said other information communication apparatus, a judging unit which judges whether the present information communication apparatus is connected to the other information communication apparatus to communicate with said other information communication apparatus through the communication circuit, and a controlling unit which makes the second acquiring unit perform a process based on the acquired signal, when the judging unit determines that the present information communication apparatus is connected to the other information communication apparatus, and makes the first acquiring unit perform a process based on the acquired signal, when the judging unit determines that the present information communication apparatus is not connected to the other information communication apparatus.

According to other aspect of the invention, there is provided an information communicating method in an information communication apparatus, wherein the apparatus is provided with a communication unit for communicating with an external apparatus, the method which comprises a first acquiring step of positioning a current location based on a signal sent from a positioning satelite, a second acquiring step of making the communication unit acquire from the external apparatus a signal that is sent from the positioning satelite and is received by the external apparatus to calculate the current location, a judging step of judging whether the communication unit is connected to the external apparatus to communicate with said external apparatus, and a controlling step of performing a process based on the signal acquired at the second acquiring step, when it is determined at the judging step that the communication unit is connected to the external apparatus, and performing a process based on the signal acquired at the first acquiring step, when it is determined at the judging step that the communication unit is not connected to the external apparatus.

According to still other aspect of the invention, there is provided a non-transitory computer-readable storage medium with an executable program stored thereon, wherein a computer is mounted on an information communication apparatus that is provided with a communication unit for communicating with an external apparatus, and the program instructs the computer to function as: a first acquiring unit which calculates a current location based on a signal sent from a positioning satelite, a second acquiring unit which makes the communication unit acquire from the external apparatus a signal that is sent from the positioning satelite and is received by the external apparatus to calculate the current location, a judging unit which judges whether the communication unit is connected to the external apparatus to communicate with said external apparatus, and a controlling unit which makes the second acquiring unit perform a process based on the acquired signal, when the judging unit determines that the communication unit is connected to the external apparatus, and makes the first acquiring unit perform a process based on the acquired signal, when the judging unit determines that the communication unit is not connected to the external apparatus.

DETAILED DESCRIPTION OF THE PREFERRED EMBODIMENTS

Now, the preferred embodiments of the invention will be described with reference to the accompanying drawings in detail. The invention will not be restricted to the particular embodiments to be described hereinafter.

Figure 1:
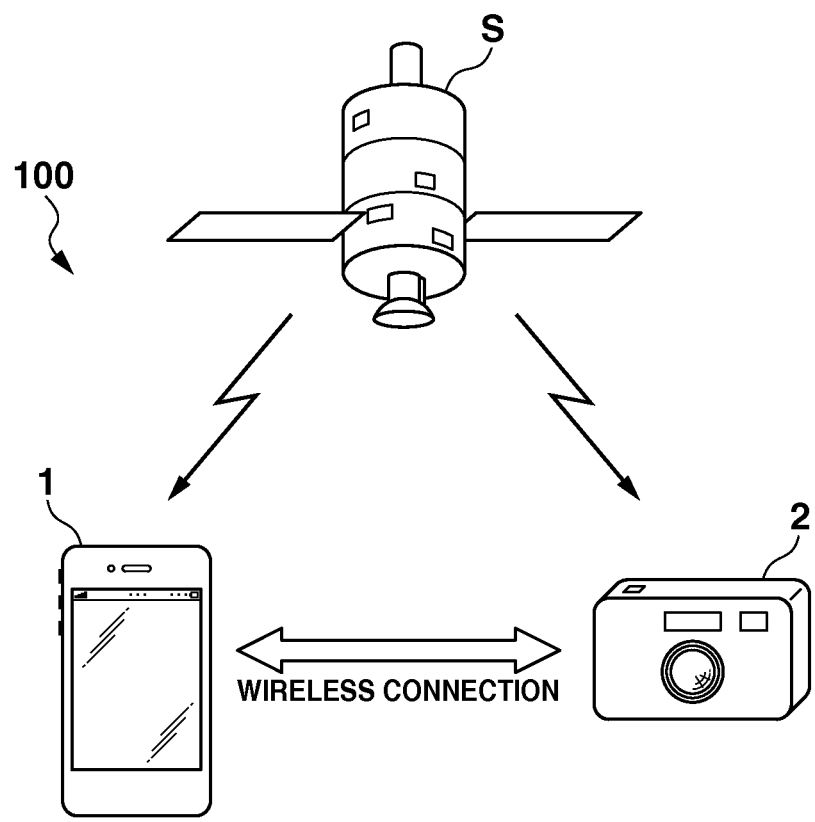
FIG. 1 is a view showing a schematic configuration of an information communication system using the preferred embodiments of the invention.

FIG. 1 is a view showing a schematic configuration of an information communication system using the preferred embodiments of the invention.

As shown in FIG. 1, there are provided a portable terminal (external apparatus: refer to FIG. 2) 1 and an imaging apparatus (information communication apparatus: refer to FIG. 3) 2 in the information communication system 100 according to the preferred embodiments of the invention. The portable terminal 1 and the imaging apparatus 2 are connected with each other through a wireless communication network (for example, through a wireless PAN (Personal Area Network), for example, such as Bluetooth (Registered Trademark)) for exchanging information to each other.

The portable terminal 1 and the imaging apparatus 2 are owned and used by the same and single user but can be used separately by different users.

The portable terminal 1 will be described with reference to FIG. 2.

Figure 2:
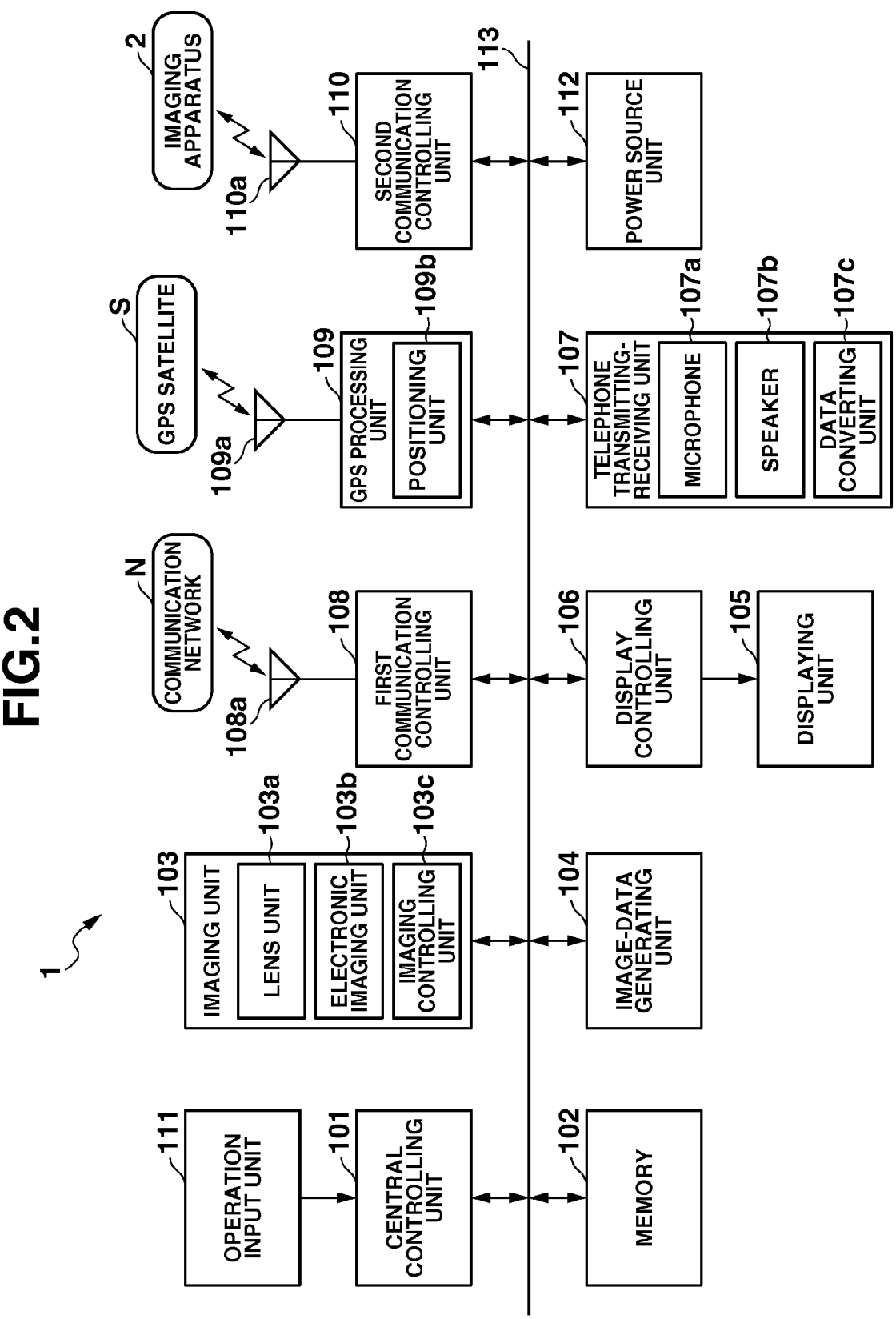
FIG. 2 is a block diagram showing a schematic configuration of a portable terminal composing the information communication system shown in FIG. 1.

FIG. 2 is a block diagram showing a schematic configuration of the portable terminal 1 composing the information communication system 100.

As shown in FIG. 2, the portable terminal 1 comprises a central controlling unit 101, a memory 102, an imaging unit 103, an image-data generating unit 104, a displaying unit 105, a display controlling unit 106, a telephone transmitting-receiving unit 107, a first communication controlling unit 108, a GPS processing unit 109, a second communication controlling unit 110, an operation input unit 111, and a power source unit 112.

Further, the central controlling unit 101, memory 102, imaging unit 103, image-data generating unit 104, display controlling unit 106, telephone transmitting-receiving unit 107, first communication controlling unit 108, GPS processing unit 109, second communication controlling unit 110, and the power source unit 112 are connected to each other through a bus line 113.

For example, the portable terminal 1 consists of a portable telephone, a mobile terminal used in a mobile communication network such as PHS (Personal Handy-phone System), and/or PDA (Personal Data Assistants).

The central controlling unit 101 controls the whole operation of the portable terminal 1. More specifically, the central controlling unit 101 comprises CPU (Central Processing Unit, not shown) for controlling the whole operation of the portable terminal 1. CPU performs a controlling operation in accordance with various sorts of processing programs (not shown) for the portable terminal 1.

The memory 102 comprises DRAM (Dynamic Random Access Memory). The memory 102 is provided with a buffer memory for temporarily storing data processed by the central controlling unit 101, a working memory used by the central controlling unit 101, and a program memory for storing various sorts of programs concerning functions of the portable terminal 1 and data. These memories are not shown.

The imaging unit 103 is provided with a lens unit 103a, an electronic imaging unit 103b, and an imaging controlling unit 103c.

The lens unit 103a consists of plural lenses including a zoom lens and a focus lens.

The electronic imaging unit 103b comprises an image sensor such as CCD (Charge Coupled Device) and/or CMOS (Complementary Metal-Oxide Semiconductor), and serves to convert an optical image passing through the lens unit 103a into a two-dimensional image signal.

Although not shown, the imaging unit 103 is sometimes provided with an aperture for adjusting a quantity of light passing through the lens unit 103a.

The imaging controlling unit 103c is provided with a timing generating device and a driver (both, not shown). The imaging controlling unit 103c operates the timing generating device and the driver to scan the electronic imaging unit 103b, thereby making the electronic imaging unit 103b convert an optical image for every given period into a two-dimensional signal. Then, the imaging controlling unit 103c reads a frame image of one image from an imaging area of the electronic imaging unit 103b, and outputs the read frame image to an image-data generating unit 104.

Meanwhile, the imaging controlling unit 103c adjusts shooting conditions including AF (automatic focusing process), AE (automatic exposure controlling process), and AWB (automatic white balancing process), under which an shooting operation is performed.

The image-data generating unit 104 adjusts gains of RGB color components contained in the analog signal corresponding to the frame image transferred from the electronic imaging unit 103b, and then supplies the RGB color components to a sample hold circuit and A/D converter (not shown), thereby converting the RGB color components into digital data. Further, the digital data is subjected to color signal processing including pixel interpolation processing and gamma correction processing in a color processing circuit (not shown), whereby a digital luminance signal Y and color-difference signals Cb and Cr (YUV data) are generated.

The image-data generating unit 104 successively outputs and stores YUV data of the generated frame images in the memory 102.

The displaying unit 105 comprises, for example, a liquid crystal displaying panel, and displays on a displaying screen an image (for example, a live view, etc.) shot by the imaging unit 103, based on a video signal from the display controlling unit 106.

The display controlling unit 106 performs a controlling operation, whereby image data temporarily stored in the memory 102 is read and displayed on the displaying unit 105.

More specifically, the display controlling unit 106 is provided with VRAM (Video Random Access Memory), VRAM controller, and a digital video encoder. The digital luminance signal Y and the color-difference signals Cb, Cr are read from the memory 102 and stored in VRAM under control of the central controlling unit 101. The digital video encoder reads the digital luminance signal Y and the color-difference signals Cb, Cr from VRAM through VRAM controller at a given playback frame rate (for instance, at 30 fps.) to generate and output a video signal to the displaying unit 105.

For example, updating plural frame images shot by the imaging unit 103 and generated by the image-data generating unit 104 at a given displaying frame rate, the display controlling unit 106 displays the live frame images on the displaying unit 105.

The telephone transmitting-receiving unit 107 will make a call with the external apparatus (external user) through a communication network N.

More specifically, the telephone transmitting-receiving unit 107 is provided with a microphone 107a, a speaker 107b, and a data converting unit 107c. In the telephone transmitting-receiving unit 107, user's telephone voice data entered from the microphone 107a is subjected to A/D converting process in the data converting unit 107c and the converted telephone voice data is output to the central controlling unit 101. Meanwhile, voice data such as telephone voice data output from and input by the first communication controlling unit 108 is subjected to D/A converting process in the data converting unit 107c, and output through the speaker 107b.

The first communication controlling unit 108 performs data transmission (data sending and/or receiving) through the communication network N and a communication antenna 108a.

In other words, the communication antenna 108a is an antenna that can be used for receiving and/or sending data in conformity with a communication system (for instance, W-CDMA (Wideband Code Division Multiple Access System) and GSM (Global System for Mobile Communications-Registered Trademark)) employed for the portable terminal 1 to communicate with a wireless base station (not shown). In accordance with a communication protocol corresponding to the given communication system and using a communication channel set by the communication system, the first communication controlling unit 108 performs data transmission with the wireless base station through the communication antenna 108a. That is, the first communication controlling unit 108 exchanges voice data and/or data of electronic mails with the external apparatuses (communication partners, external users) in accordance with an instruction signal output from and input by the central controlling unit 101.

The above described configuration of the first communication controlling unit 108 is one example and is not limited to the one described herein. The configuration of the first communication controlling unit 108 will be arranged in any manner. For example, it is also possible to mount a wireless LAN module (not shown) on the first communication controlling unit 108 to make the unit 108 access the communication network N through an Access Point.

The communication network N is used by the portable terminal 1 to contact with the external apparatus through the wireless base station and a gateway server (not shown).

Further, the communication network N is a communication network that is constructed by using exclusive lines and/or existing public lines. Various networks such as LAN (Local Area Network) and WAN (Wide Area Network) can be used to construct the communication network N. In the communication network N are contained various communication networks such as telephone circuit networks, ISDN networks, exclusive lines, mobile communication networks, communication satellite networks, and CATV circuit networks, and IP network, VoIP (Voice over Internet Protocol) gateway, and Internet service providers.

The GPS processing unit 109 receives signals sent from GPS satellites S, . . . to calculate the current location of the portable terminal 1.

More specifically, the GPS processing unit 109 receives GPS signals (for example, Almanac—approximate orbit information and Ephemeris—detailed orbit information) from plural GPS satellites S, . . . , which are launched to the low earth orbit, at a given timing through a reception antenna 109a. In FIG. 1, only one positioning satellite is shown for convenience. The GPS processing unit 109 demodulates the GPS signals are received through the reception antenna 109a to generate GPS information. It is possible that the generated GPS information is sent to the memory 102 and temporarily stored therein.

A positioning unit 109b of the GPS processing unit 109 performs a predetermined positioning operation using the GPS information to calculate an absolute current three-dimensional position (latitude, longitude, and height) of the portable terminal 1, thereby acquiring positional information (for example, coordinate information of latitude, longitude, and height) representing the location. It is possible that the current positional information of the portable terminal 1 acquired by the positioning unit 109b is sent to the memory 102 and temporarily stored therein.

The second communication controlling unit 110 communicates with the imaging apparatus 2 which is connected with the portable terminal 1 through a given wireless communication circuit.

In other words, the second communication controlling unit 110 connects with the imaging apparatus 2, for instance, through a wireless PAN (Personal Area Network) implemented in accordance with a wireless communication standard for exchanging data over short distances such as Bluetooth.

More specifically, the second communication controlling unit 110 is provided with a controlling module for exchanging data with the imaging apparatus 2 in accordance with Bluetooth wireless data exchanging standard through the communication antenna 110a. Further, previously performing a communication setting process so-called "pairing", the second communication controlling unit 110 can exchange information of a device and data of an authentication key with the communication partner using a wireless signal. Thereafter, the portable terminal 1 has been brought into a state, in which the terminal 1 can be automatically or semi-automatically connected with or released from the communication partner. For instance, when the portable terminal 1 has been separated far from the imaging apparatus 2 in the distance such that radio waves used for wireless communication cannot reach the imaging apparatus 2, the portable terminal 1 will be automatically released from the imaging apparatus 2. Meanwhile, when the portable terminal 1 has been brought close to the imaging apparatus 2 in the area where the radio waves can reach, the portable terminal 1 will be automatically connected with the imaging apparatus 2. The portable terminal 1 will be semi-automatically connected or released by a user's operation.

The second communication controlling unit 110 obtains GPS information from the memory 102, and sends the GPS information to the imaging apparatus 2 through the wireless PAN. That is, upon receipt of a request of sending GPS information from the imaging apparatus 2, the second communication controlling unit 110 obtains the GPS information temporarily stored in the memory 102 and successively sends the GPS information to the imaging apparatus 2 through the wireless PAN.

The operation input unit 111 is used by the user to enter various instructions to the portable terminal 1. More specifically, the operation input unit 111 is provided with a power button for turning on and/or off the power of the portable terminal 1, a shutter button for a shooting operation, a cursor for selecting a function, a mode, and an instruction, a decision button, communication buttons concerning telephone calls, sending/receiving electronic mails, and numeral/character buttons used for entering characters, numerals and symbols (all of them, not shown).

When the user operates the button(s), the operation input unit 111 will send an instruction corresponding to the operated button(s) to the central controlling unit 101. In accordance with the instruction sent from the operation input unit 111, the central controlling unit 101 makes various units perform predetermined operations (for instance, the shooting operation, sensing/receiving a telephone call, sensing/receiving an electronic mail, etc.).

It is possible that the operation input unit 111 has a touch panel integrated with the displaying unit 105 and that the operation input unit 111 will send the central controlling unit 101 an instruction corresponding to the user's operation performed on the touch panel.

The power source unit 112 supplies power to units composing the portable terminal 1. The power source unit 112 has a various types of batteries (for instance, a lithium ion battery, and a nickel hydrogen rechargeable battery). Therefore, a voltage source capacity to be supplied from the power source 112 will be restricted to a given capacity. The power source unit 112 can comprise a configuration that is supplied from AC power source.

Now, the imaging apparatus 2 will be described with reference to FIG. 3.

Figure 3:
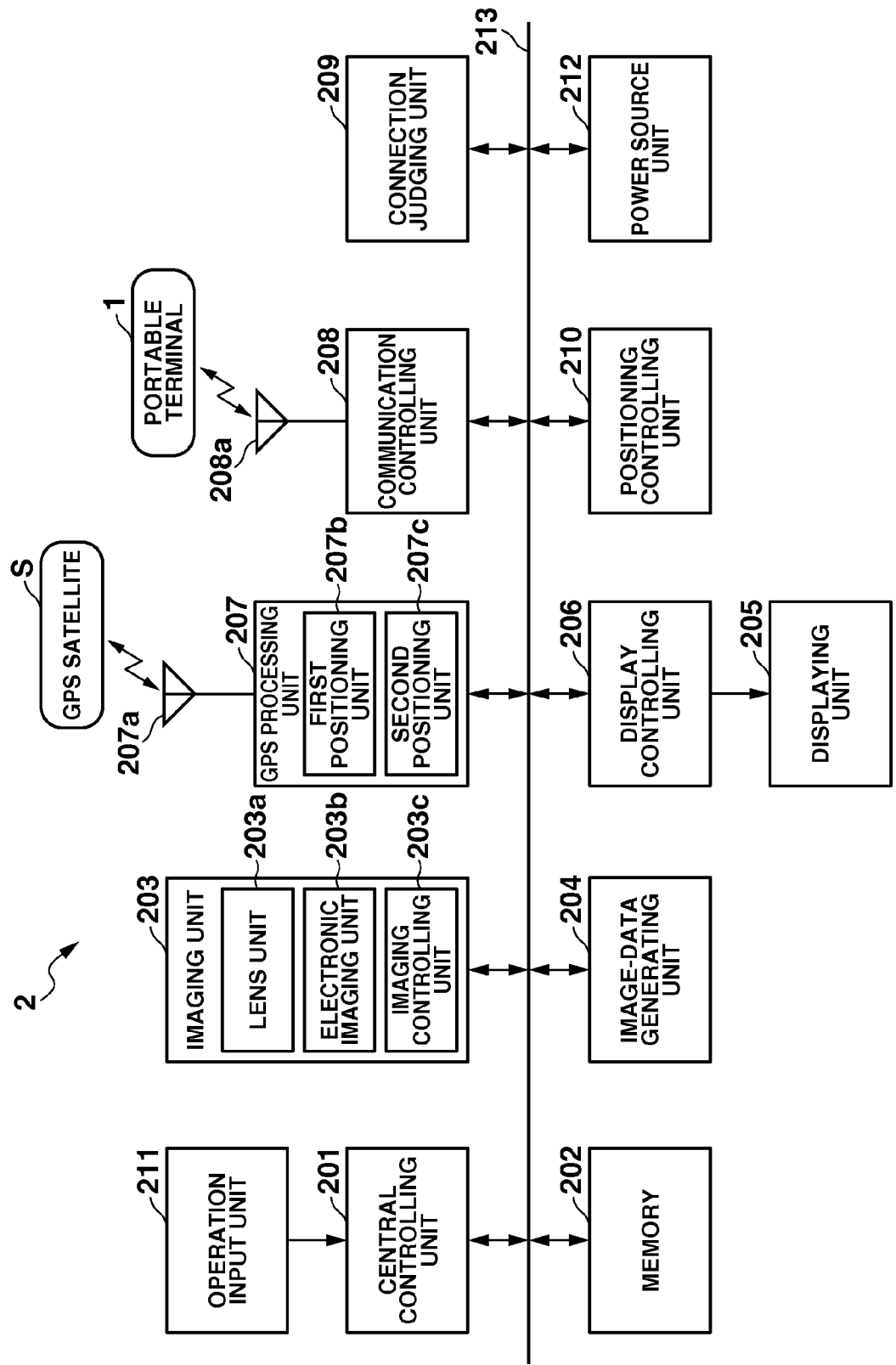
FIG. 3 is a block diagram of a schematic configuration of an imaging apparatus composing the information communication system shown in FIG. 1.

FIG. 3 is a block diagram of a schematic configuration of the imaging apparatus 2 composing the information communication system 100.

As shown in FIG. 3, the imaging apparatus 2 comprises a central controlling unit 201, a memory 202, an imaging unit 203, an image-data generating unit 204, a displaying unit 205, a display controlling unit 206, a GPS processing unit 207, a communication controlling unit 208, a connection judging unit 209, a positioning controlling unit 210, an operation input unit 211, and a power source unit 212.

Further, the central controlling unit 201, memory 202, imaging unit 203, image-data generating unit 204, display controlling unit 206, GPS processing unit 207, communication controlling unit 208, connection judging unit 209, positioning controlling unit 210, and the power source unit 212 are connected to each other through a bus line 213.

The central controlling unit 201 controls the whole operation of the imaging apparatus 2. More specifically, the central controlling unit 201 comprises CPU (not shown) for controlling operations of various parts in the imaging apparatus 2. CPU performs various controlling operations in accordance with various sorts of processing programs (not shown) for the imaging apparatus 2.

The memory 202 comprises DRAM (Dynamic Random Access Memory). The memory 102 is provided with a buffer memory for temporarily storing data processed by the central controlling unit 201, a working memory used by the central controlling unit 201, and a program memory for storing various sorts of programs concerning functions of the imaging apparatus 2 and data. These memories are not shown in FIG. 3.

The imaging unit 203 has substantially the same configuration as the imaging unit 103 of the portable terminal 1 and is provided with a lens unit 203a, an electronic imaging unit 203b, and an imaging controlling unit 203c.

As described, the configuration and functions of the imaging unit 203 are substantially the same as those of the imaging unit 103 of the portable terminal 1, and therefore further description thereof will be omitted.

The configurations and functions of the image-data generating unit 204, displaying unit 205, and display controlling unit 206 are substantially the same as those of the image-data generating unit 104, displaying unit 105, and display controlling unit 106 of the portable terminal 1, and therefore further description thereof will be omitted.

The GPS processing unit 207 works in a similar manner to the GPS processing unit 109 and receives signals sent from GPS satellites S, . . . to calculate the current location of the imaging apparatus 2.

More specifically, the GPS processing unit 207 receives GPS signals from plural GPS satellites S, . . . , which are launched to the low earth orbit, at a given timing through a reception antenna 207a. The GPS processing unit 207 demodulates the GPS signals received through the reception antenna 207a to generate GPS information. It is possible that the generated GPS information is sent to the memory 202 and temporarily stored therein.

A first positioning unit (first positioning means) 207b of the GPS processing unit 207 performs the positioning operation using the GPS information to calculate an absolute current three-dimensional position (latitude, longitude, and height) of the imaging apparatus 2, thereby acquiring positional information (for instance, coordinate information of latitude, longitude, and height) representing the location. More specifically, while the imaging apparatus 2 and the portable terminal 1 are not connected to each other to exchange information through the wireless PAN, the first positioning unit 207b generates the positional information representing the current location of the imaging apparatus 2, based on the GPS information under control of the positioning controlling unit 210.

Before starting calculating the current location of the imaging apparatus 2 in the above manner, it is possible for the first positioning unit 207b to obtain and use GPS information which has been received from the portable terminal 1 through the communication controlling unit 208 and temporarily stored in the memory 202 to calculate the current location of the imaging apparatus 2.

Further, it is possible that the current positional information representing the current location of the imaging apparatus 2, calculated by the first positioning unit 207b is sent to the memory 202 and temporarily stored therein.

A second positioning unit (second positioning means) 207c of the GPS processing unit 207 calculates the current location of the imaging apparatus 2 based on GPS information acquired by the communication controlling unit 208.

More specifically, the second positioning unit 207c obtains GPS information which has been obtained by the communication controlling unit 208 and temporarily stored in the memory 202 under control of the positioning controlling unit 210, that is, GPS information which has been generated by the GPS processing unit 109 of the portable terminal 1, and performs the given positioning operation based on the GPS information to calculate the absolute current three-dimensional position (latitude, longitude, and height) of the imaging apparatus 2, thereby acquiring the positional information (for instance, coordinate information of latitude, longitude, and height) representing the location.

The communication controlling unit 208 communicates with the portable terminal 1 which is connected with the imaging apparatus 2 through a given wireless communication circuit.

In other words, the communication controlling unit 208 is provided with a communication antenna 208a and connects with the portable terminal 1 through the wireless PAN implemented in accordance with the wireless communication standard for exchanging data over short distances such as Bluetooth.

The configuration and functions of the communication controlling unit 208 are substantially the same as those of the second communication controlling unit 110 of the portable terminal 1, and therefore further description thereof will be omitted.

The communication controlling unit 208 acquires signals which the portable terminal 1 (external apparatus) has received from GPS satellites S, . . . , from said portable terminal 1 through the wireless PAN (a given communication circuit). In other words, the communication controlling unit 208 receives GPS information which is successively sent through the wireless PAN from the portable terminal 1 in response to an instruction of sending GPS information. The communication controlling unit 208 sends the received GPS information to the memory 202 and stores therein.

The connection judging unit (connection judging means) 209 serves to judge whether the imaging apparatus 2 has been connected to the portable terminal 1 to communicate with said portable terminal 1. In other words, the connection judging unit 209 judges whether the communication controlling unit 208 of the imaging apparatus 2 has been connected to the portable terminal 1 (external apparatus) to communicate with said portable terminal 1 through the wireless PAN. The connection judging unit 209 performs the judging process for every given interval and/or every time when the GPS processing unit 109 performs a positioning operation to calculate the current location of the portable terminal 1. A result of the judgment is output to the positioning controlling unit 210.

The positioning controlling unit (positioning controlling means) 210 controls a process (positioning process) of acquiring the current location of the imaging apparatus 2.

In other words, when the connection judging unit 209 determines that the imaging apparatus 2 is connected with the portable terminal 1, the positioning controlling unit 210 makes the communication controlling unit 208 acquire signals (GPS information) which the portable terminal 1 has received from GPS satellites S, . . . , from said portable terminal 1 through the wireless PAN.

More specifically, when the connection judging unit 209 determines that the imaging apparatus 2 is connected and allowed to communicate with the portable terminal 1 through the wireless PAN, the positioning controlling unit 210 sends the power source unit 212 an instruction signal of ceasing supplying power to the GPS processing unit 207 and also gives the GPS processing unit 207 a controlling instruction of making the first positioning unit 207b cease performing the positioning process of the current location. Further, the positioning controlling unit 210 gives the communication controlling unit 208 an instruction of sending GPS information generated by the portable terminal 1 to the imaging apparatus 2. In this way, the positioning controlling unit 210 makes the communication controlling unit 208 acquire GPS information generated by the portable terminal 1 through the wireless PAN.

Meanwhile, when the connection judging unit 209 determines that the imaging apparatus 2 is not connected to the portable terminal 1 to communicate with said portable terminal 1 through the wireless PAN, the positioning controlling unit 210 gives the power source unit 212 an instruction signal of supplying power to the GPS processing unit 207 and also gives the GPS processing unit 207 an instruction of making the first positioning unit 207b start performing the positioning process of the current location.

The operation input unit 211 is used by the user to enter various instructions to the imaging apparatus 2. More specifically, the operation input unit 211 is provided with a power source button for turning on and/or off the power of the imaging apparatus 2, a shutter button for a shooting operation, a selection button for selecting a shooting mode and a function, and a zoom button for adjusting a zooming amount (all of them, not shown).

When the user operates the button(s), the operation input unit 211 will send an instruction corresponding to the operated button(s) to the central controlling unit 201. In accordance with the instruction sent from the operation input unit 111, the central controlling unit 201 makes various units perform predetermined operations (for instance, the shooting operation).

The power source unit 212 supplies power to units composing the imaging apparatus 2. The power source unit 212 has a various types of batteries (for instance, a lithium ion battery, and a nickel hydrogen rechargeable battery). Therefore, a voltage source capacity to be supplied from the power source 212 will be restricted to a given capacity.

<Positioning Process>

Hereinafter, the positioning process will be described with reference to FIG. 4 in detail.

Figure 4:
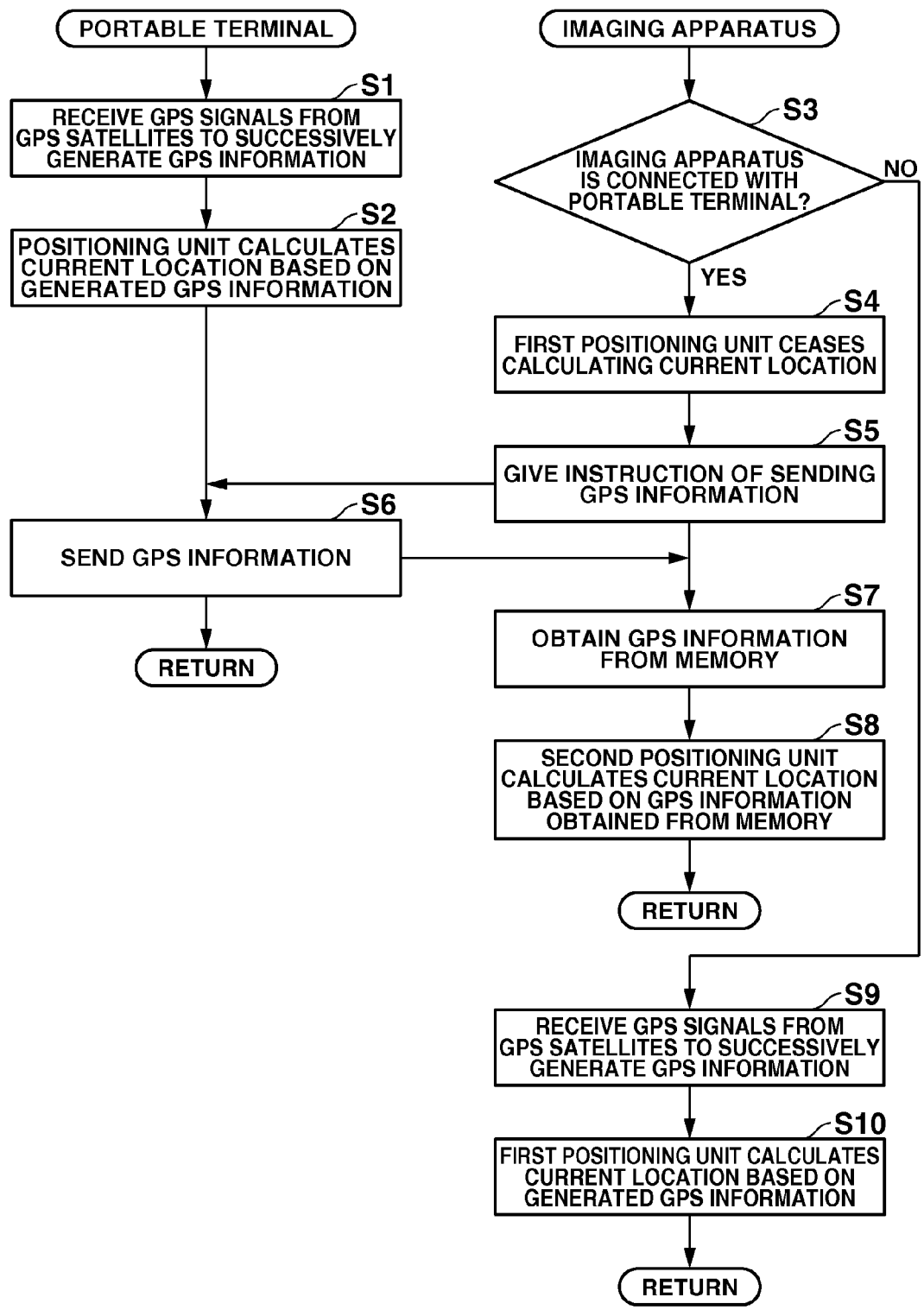
FIG. 4 is a flow chart of an example of operations in an acquisition process performed in the information communication system shown in FIG. 1.

FIG. 4 is a flow chart of an example of operations performed in the positioning process.

The positioning process is sequentially performed in scheduled timing. It is assumed that, in the portable terminal 1, the current location is sequentially calculated every scheduled interval and also it is assumed that, in the imaging apparatus 2, the current location is calculated every time when the user has operated the operation input unit 211 to instruct to perform a shooting operation.

As shown in FIG. 4, in the portable terminal 1, the GPS processing unit 109 receives GPS signals from GPS satellites S, . . . through the reception antenna 109a and demodulates the received GPS signals to successively generate GPS information (step S1). The positioning unit 109b uses the generated GPS information to perform the predetermined positioning operation, calculating the current location (latitude, longitude, and height) of the portable terminal 1 (step 2). The generated GPS information is sent to the memory 102 and temporarily stored therein.

Meanwhile in the imaging apparatus 2, when the user has operated the shutter button of the operation input unit 211 to give an instruction of performing a shooting operation, the connection judging unit 209 judges whether the communication controlling unit 208 is connected to and allowed to communicate with the portable terminal 1 through the wireless PAN (step S3).

When it is determined that the communication controlling unit 208 is connected to and allowed to communicate with the portable terminal 1 through the wireless PAN (YES at step S3), the positioning controlling unit 210 gives the GPS processing unit 207 a controlling instruction of making the first positioning unit 207b cease performing the positioning process of the current location (step S4). Then, the first positioning unit 207b of the GPS processing unit 207 ceases positioning the current location.

Further, the positioning controlling unit 210 gives the communication controlling unit 208 an instruction of sending the imaging apparatus 2 GPS information generated by the portable terminal 1 and the communication controlling unit 208 sends said instruction to the portable terminal 1 through the wireless PAN (step S5).

In the portable terminal 1, when the second communication controlling unit 110 has received from the imaging apparatus 2 the instruction of sending GPS information, the second communication controlling unit 110 obtains GPS information stored in the memory 102 and sends said GPS information to the imaging apparatus 2 through the wireless PAN (step S6).

In the imaging apparatus 2, upon receipt of GPS information from the portable terminal 1, the communication controlling unit 208 sends the GPS information to the memory 202 and temporarily stores said GPS information therein (step S7). Further, the second positioning unit 207c of the GPS processing unit 207 obtains the GPS information stored in the memory 202 and performs the positioning operation based on said GPS information, calculating the current location (latitude, longitude, and height) of the imaging apparatus 2 (step S8).

It is possible that positional information representing the current location of the imaging apparatus 2, calculated by the second positioning unit 207c is sent to the memory 202 and temporarily stored therein.

Meanwhile, when it is determined that the communication controlling unit 208 is not connected to the portable terminal 1 to communicate with said portable terminal 1 through the wireless PAN (NO at step S3), the GPS processing unit 207 receives GPS signals from GPS satellites S, . . . through the reception antenna 207a and demodulates the received GPS signals, successively generating GPS information (step S9). The first positioning unit 207b executes the predetermined positioning operation based on the generated GPS information, thereby positioning the current location (latitude, longitude, and height) of the imaging apparatus 2 (step S10).

It is possible that the positional information representing the current location of the imaging apparatus 2, calculated by the first positioning unit 207b is sent to the memory 202 and temporarily stored therein.

After the positioning process has been finished, a record controlling unit (not shown) associates image data representing a shot image, coded in a predetermined compressed format (for instance, JPEG format) by the image-data generating unit 204, with the positional information of a shooting location calculated as the current location of the imaging apparatus 2, creating a file in a predetermined format (for example, in Exif format) and recording the file in a recording medium (not shown).

As has been described above, in the information communication system 100 according to the embodiments of the invention, when it is determined that the imaging apparatus 2 is connected to and allowed to communicate with the portable terminal 1, the imaging apparatus 2 makes the first positioning unit 207b of the GPS processing unit 207 cease positioning the current location, and meanwhile makes the communication controlling unit 208 acquire the signal (GPS information) which the portable terminal 1 has received from GPS satellites S, . . . , from said portable terminal 1 through the wireless PAN, and the second positioning unit 207c calculates the current location based on the GPS information acquired by the communication controlling unit 208.

Therefore, in the situation where the imaging apparatus 2 is connected to the portable terminal 1 and allowed to communicate with the portable terminal 1, the first positioning unit 207b which consumes comparatively a large amount of electricity does not perform the positioning process of the current location and meanwhile the second positioning unit 207c which consumes comparatively a little amount of electricity performs the positioning process of the current location based on the GPS information obtained from the portable terminal 1, whereby electric power saving can be enhanced in the imaging apparatus 2. As described, in the imaging apparatus 2, the electric power to be consumed in the positioning process of calculating the current location will be saved, and effect of the power consumption to other process, for instance, such as the shooting operation will be made least.

When it is determined that the imaging apparatus 2 is not connected to the portable terminal 1 to communicate with said portable terminal 1, the first positioning unit 207b starts calculating the current location. Therefore, in the situation where the imaging apparatus 2 is not connected to the portable terminal 1 to communicate with said portable terminal 1, the first positioning unit 207b calculates the current location based on the signal (GPS information) sent from GPS satellites S, . . . , and accordingly the current location of the imaging apparatus 2, for instance, a position where an image has been shot with the imaging apparatus 2 can be specified precisely.

In the case the first positioning unit 207b calculates the current location using GPS information which has been received by the portable terminal 1 and stored in the memory 202, before starting positioning the current location, the positioning process of the current location can be performed more effectively than performing the positioning process of the current location with giving no consideration to relative arrangement of GPS satellites at the previous positioning location. In this case, the first positioning unit 207b consuming relatively more electricity can properly reduce power consumption in the positioning process of the current location.

The invention is not limited to the particular embodiments described herein, but modifications and rearrangements may be made to the disclosed embodiments while remaining within the scope of the invention.

For instance, in the above embodiments, the GPS information generated in the portable terminal 1 is sent to the imaging apparatus 2, but it is possible for the GPS processing unit 109 of the portable terminal 1 to receive and send GPS signal to the imaging apparatus 2. In this case, the imaging apparatus 2 demodulates the received GPS signal to obtain GPS information.

In the above described embodiments, when it is determined that the imaging apparatus 2 is connected to the portable terminal 1 to communicate with said the portable terminal 1, the imaging apparatus 2 makes the first positioning unit 207b of the GPS processing unit 207 cease positioning the current location and meanwhile makes the communication controlling unit 208 acquire signal (GPS information) that the portable terminal 1 has received from GPS satellites s, . . . , from said portable terminal 1, and the second positioning unit 207c uses the GPS information acquired by the communication controlling unit 208 to calculate the current location. But, it will be possible for the second positioning unit 207c to use time information contained in the GPS information to correct the time of a built-in clock of the imaging apparatus 2.

The configurations and the number of the portable terminal 1 and the imaging apparatus 2 disclosed in the embodiments are just examples and are not limited to those disclosed in the embodiments.

In the embodiments described above, the portable terminal 1 is given as an example of the external apparatus and also the imaging apparatus 2 is given as the information communication apparatus. The external apparatus and information communication apparatus are not limited to these particular embodiments, but it is possible that the imaging apparatus 2 serves as the external apparatus and the portable terminal 1 serves as the information communication apparatus. Further, it is possible that the portable terminal 1 and the imaging apparatus 2 serve as the information communication apparatus and the external apparatus. In this case, it is possible to switch the function of the portable terminal 1 and the imaging apparatus 2 to work as the information communication apparatus or the external apparatus, depending on the remaining capacity of the power source unit 112 (212).

In addition, in the embodiments, the functions of the first positioning means, the connection judging means, the positioning controlling means and the second positioning means are provided respectively, when the first positioning unit 207b, the connection judging unit 209, the positioning controlling unit 210 and the second positioning unit 207c are driven under control of CPU of the central controlling unit 201 in the imaging apparatus 2. But the functions of these means will be realized in other manner, that is, it is possible for the central controlling unit 201 to provide the functions of these means by running a predetermined program.

A program containing a first positioning process routine, a connection judging process routine, a controlling process routine and a second positioning process routine is stored in a program memory (not shown). In the first positioning process routine, it will be possible based on the signals sent from GPS satellites S, . . . , for CPU of the central controlling unit 201 to function as the first positioning means for calculating the current location. Further, in the connection judging process routine, it will be possible for CPU of the central controlling unit 201 to function as the connection judging means for judging whether communication means is connected to an external apparatus to communicated with said external apparatus.

In the controlling process routine, it will be possible for CPU of the central controlling unit 201 to function as the positioning controlling means, wherein the positioning controlling means makes the first positioning means cease positioning the current location and makes communication means acquire signals that the external information communication apparatus has received from GPS satellites S, . . . , from said the external information communication apparatus through a given communication network, when it is determined that the imaging apparatus is connected to an external information communication apparatus. In the second positioning process routine, it will be possible for CPU of the central controlling unit 201 to function as second acquiring means for positioning the current location based on the signal acquired by the communication means under control of the positioning controlling means.

It is possible to use portable recording media such as non-volatile memories including flash memories, CD-ROM, etc. as computer readable recording media for recording the program for executing the above processes. As media for providing data for the computers through a given communication circuit, a carrier wave can be used.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. An information communication apparatus comprising:
    a communication unit which communicates with an external apparatus;
    a first acquiring unit which acquires a signal sent from a positioning satellite;
    a second acquiring unit which uses the communication unit to acquire from the external apparatus a signal that is sent from the positioning satelite and is received by the external apparatus;
    a judging unit which judges whether the communication unit is connected to the external apparatus to communicate with said external apparatus; and
    a controlling unit which makes the second acquiring unit perform a process based on the acquired signal, when the judging unit determines that the communication unit is connected to the external apparatus, and makes the first acquiring unit perform a process based on the acquired signal, when the judging unit determines that the communication unit is not connected to the external apparatus.

2. The information communication apparatus according to claim 1, wherein
    the controlling unit makes the second acquiring unit perform a positioning operation to generate positional information, based on the acquired signal, when the judging unit determines that the communication unit is connected to the external apparatus, and makes the first acquiring unit perform a positioning operation to generate positional information, based on the acquired signal, when the judging unit determines that the communication unit is not connected to the external apparatus.

3. The information communication apparatus according to claim 2, further comprising:
    a holding unit which successively holds the signal received by the communication unit, and wherein
    the first acquiring unit uses the signal held in the holding unit to perform the positioning operation to generate positional information.

4. The information communication apparatus according to claim 2, further comprising:
    an imaging unit which images a subject to generate image data; and
    a recording unit which associates the image data generated by the imaging unit with the positional information generated by one of the first acquiring unit and the second acquiring unit, and records the image data associated with the positional information.

5. The information communication apparatus according to claim 4, further comprising:
    an instruction unit which gives the imaging unit an instruction of imaging a subject, and wherein
    the judging unit judges whether the communication unit is connected to the external apparatus to communicate with said external apparatus, when the instruction unit has given the instruction.

6. The information communication apparatus according to claim 2, wherein
    the controlling unit makes the first acquiring unit cease performing the positioning operation, when the judging unit determines that the communication unit is connected to the external apparatus.

7. The information communication apparatus according to claim 1, wherein
    the controlling unit makes the second acquiring unit perform time correction based on the acquired signal, when the judging unit determines that the communication unit is connected to the external apparatus, and makes the first acquiring unit perform time correction based on the acquired signal, when the judging unit determines that the communication unit is not connected to the external apparatus.

8. An information communication system, wherein plural information communication apparatuses are connected to each other through a communication circuit, and at least one of the plural information communication apparatuses comprises:

a first acquiring unit which calculates a current location based on a signal sent from a positioning satelite;

a second acquiring unit which acquires a signal from the other information communication apparatus through the communication circuit to calculate the current location, wherein the signal is sent from the positioning satelite and is received by said other information communication apparatus;

a judging unit which judges whether the present information communication apparatus is connected to the other information communication apparatus to communicate with said other information communication apparatus through the communication circuit; and a controlling unit which makes the second acquiring unit perform a process based on the acquired signal, when the judging unit determines that the present information communication apparatus is connected to the other information communication apparatus, and makes the first acquiring unit perform a process based on the acquired signal, when the judging unit determines that the present information communication apparatus is not connected to the other information communication apparatus.

9. An information communicating method in an information communication apparatus, wherein the apparatus is provided with a communication unit for communicating with an external apparatus, the method comprising:

a first acquiring step of positioning a current location based on a signal sent from a positioning satelite;

a second acquiring step of making the communication unit acquire from the external apparatus a signal that is sent from the positioning satelite and is received by the external apparatus to calculate the current location;

a judging step of judging whether the communication unit is connected to the external apparatus to communicate with said external apparatus; and a controlling step of performing a process based on the signal acquired at the second acquiring step, when it is determined at the judging step that the communication unit is connected to the external apparatus, and performing a process based on the signal acquired at the first acquiring step, when it is determined at the judging step that the communication unit is not connected to the external apparatus.

10. A non-transitory computer-readable storage medium with an executable program stored thereon, wherein a computer is mounted on an information communication apparatus that is provided with a communication unit for communicating with an external apparatus, and the program instructs the computer to function as:

a first acquiring unit which calculates a current location based on a signal sent from a positioning satelite;

a second acquiring unit which makes the communication unit acquire from the external apparatus a signal that is sent from the positioning satelite and is received by the external apparatus to calculate the current location;

a judging unit which judges whether the communication unit is connected to the external apparatus to communicate with said external apparatus; and a controlling unit which makes the second acquiring unit perform a process based on the acquired signal, when the judging unit determines that the communication unit is connected to the external apparatus, and makes the first acquiring unit perform a process based on the acquired signal, when the judging unit determines that the communication unit is not connected to the external apparatus.

* * * * *